US008459023B2

(12) United States Patent
Kassner

(10) Patent No.: US 8,459,023 B2
(45) Date of Patent: Jun. 11, 2013

(54) METHOD AND DEVICE FOR PROVIDING A ROTATIONAL SPEED AND TEMPERATURE INDICATION OF A SUPERCHARGING DEVICE FOR AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 468 days.

(21) Appl. No.: 12/800,739

(22) Filed: May 21, 2010

(65) Prior Publication Data

US 2010/0313855 A1   Dec. 16, 2010

(30) Foreign Application Priority Data

Jun. 16, 2009 (DE) .......................... 10 2009 026 971

(51) Int. Cl.
*F02B 33/44* (2006.01)

(52) U.S. Cl.
USPC ...................................................... 60/605.1

(58) Field of Classification Search
USPC ...................................................... 60/605.1
See application file for complete search history.

(56) References Cited

U.S. PATENT DOCUMENTS

| | | | | |
|---|---|---|---|---|
| 4,046,003 A * | 9/1977 | Armstrong et al. | ......... | 73/114.37 |
| 4,061,025 A * | 12/1977 | Willenbecher et al. | ..... | 73/114.25 |
| 4,061,026 A * | 12/1977 | Goodfriend et al. | ....... | 73/114.25 |
| 4,069,707 A * | 1/1978 | Cook et al. | ................. | 73/114.77 |
| 4,339,801 A * | 7/1982 | Hosaka et al. | ................ | 701/102 |
| 4,400,944 A * | 8/1983 | Iwamoto et al. | ............. | 60/605.1 |
| 4,470,390 A * | 9/1984 | Omori et al. | ............... | 123/198 F |
| 4,492,203 A * | 1/1985 | Yutaka | ........................... | 123/478 |
| 5,510,989 A * | 4/1996 | Zabler et al. | ...................... | 701/1 |
| 6,401,457 B1 * | 6/2002 | Wang et al. | ..................... | 60/599 |
| 6,539,714 B1 * | 4/2003 | Wang | .............................. | 60/598 |
| 6,698,203 B2 * | 3/2004 | Wang | .............................. | 60/611 |
| 7,143,580 B2 * | 12/2006 | Ge | ................................. | 60/605.1 |
| 7,286,923 B2 * | 10/2007 | Pomeroy et al. | ............. | 701/100 |
| 7,296,562 B2 * | 11/2007 | Withrow et al. | ........... | 123/559.1 |
| 7,380,446 B2 * | 6/2008 | Baeuerle et al. | ........... | 73/114.39 |
| 7,706,950 B2 * | 4/2010 | Hino et al. | ...................... | 701/51 |
| 2005/0155349 A1 * | 7/2005 | Sugiura et al. | ............... | 60/605.1 |
| 2005/0166593 A1 * | 8/2005 | Takahashi et al. | ............. | 60/612 |
| 2006/0260304 A1 * | 11/2006 | Ishiwatari | ...................... | 60/599 |
| 2008/0034753 A1 * | 2/2008 | Furman et al. | ............... | 60/605.1 |
| 2009/0320468 A1 * | 12/2009 | Shimizu et al. | ................ | 60/608 |
| 2010/0332180 A1 * | 12/2010 | Seidel et al. | ................... | 702/145 |

FOREIGN PATENT DOCUMENTS

| | | |
|---|---|---|
| WO | WO 2005/012919 | 2/2005 |
| WO | WO 2006/045680 | 5/2006 |

* cited by examiner

*Primary Examiner* — Thomas Denion
*Assistant Examiner* — Ngoc T Nguyen
(74) *Attorney, Agent, or Firm* — Kenyon & Kenyon LLP

(57) ABSTRACT

A detection circuit for providing indications of a rotational speed and a temperature of a supercharging system for an internal combustion engine is provided, which detection circuit includes: a rotational speed sensor for providing a periodic detection signal having a frequency dependent on a rotational speed in the supercharging system; a temperature sensor for detecting a temperature in the supercharging system; and a modification unit for providing a periodic output signal having a periodicity dependent on the periodic detection signal, and for setting a time length of a signal pulse of the periodic output signal as a function of the detected temperature, so that the periodic output signal provides the rotational speed indication by its periodicity and the temperature indication by the time length of the signal pulse.

11 Claims, 2 Drawing Sheets

METHOD AND DEVICE FOR PROVIDING A ROTATIONAL SPEED AND TEMPERATURE INDICATION OF A SUPERCHARGING DEVICE FOR AN INTERNAL COMBUSTION ENGINE

BACKGROUND OF THE INVENTION

1. Field of the Invention

The present invention relates to an internal combustion engine having a supercharging system, e.g., exhaust-gas turbocharger.

2. Description of the Related Art

Increasingly, internal combustion engines are provided with supercharging systems to increase the amount of air suppliable to the internal combustion engine. This may substantially improve the power and efficiency of the internal combustion engine.

As a rule, supercharging systems have a turbine which is situated in an exhaust gas section of the internal combustion engine. The turbine is coupled to a compressor in an air supply section via a suitable mechanical system in such a way that a rotation of a turbine wheel of the turbine is converted into a rotation of a compressor wheel of the compressor. The turbine wheel and the compressor wheel are usually connected to each other by a shaft.

With the aid of the supercharging system, a boost pressure is set on an output side of the compressor by using an actuator adjustment to influence either the amount of exhaust gas flowing over the turbine of the supercharging system or the turbine efficiency, e.g., with the aid of a variable turbine geometry.

Since the rotational speed of the supercharging system driven by exhaust gas enthalpy largely depends on the exhaust gas enthalpy, the maximum permissible rotational speed of the supercharging system may, under some circumstances, be exceeded, depending on the operating mode of the internal combustion engine. Exceeding this rotational speed usually destroys the supercharging system. In particular, supercharging systems having small turbine and compressor wheel diameters, which have an improved angular acceleration performance due to a low moment of inertia, may very quickly exceed the maximum permissible rotational speed in dynamic situations. For these situations, it is desirable to control or regulate the rotational speed of the rotor assembly of the supercharging system to enable improved protection against an excess rotational speed.

Moreover, in the case of two- or multi-stage supercharging due to series- or parallel-connecting supercharging systems having different characteristics, it is particularly useful to regulate the supercharging systems as a function of their rotational speed.

The rotational speed of turbochargers can be detected, e.g., as described in published PCT international patent application document WO 2006/045680 A1, with the aid of a magnet attached to a shaft of the rotor assembly, whose rotation is detected along with the rotational speed of the shaft, using a Hall element on the compressor housing. Alternatively, as described in published PCT international patent application document WO 2005/012919 A1, a rotational speed detection system may be provided which detects eddy currents produced by the motion of the compressor blades in a stationary magnetic field, using a GMR element.

Furthermore, it may be necessary to monitor the temperature of the supercharging system. After all, depending on the operating point of the internal combustion engine, a very high temperature may occur, which may damage the supercharging system.

A temperature detection system for a supercharging system is known from published German patent document DE 10 2006 021 430 A1. The fact that impermissibly high temperatures of the supercharging system are avoidable by monitoring the temperature is described therein. In particular, the supercharging system may be operated as a function of the detected temperature in such a way that its temperature may be lowered, e.g., by reducing the boost pressure or by correspondingly activating an electric radiator fan. The rotational speed is detected with the aid of an integrated circuit which is used to evaluate the rotational speed sensor signal, and with the aid of a diode which has a temperature-dependent current-voltage characteristic. As a measure of the temperature of the supercharging system, an indication may thus be provided about a voltage drop via the diode. It is possible to switch back and forth between detection of the rotational speed sensor signal and the temperature detection with the aid of the diode to provide either a rotational speed indication or a temperature indication by the integrated circuit.

The disadvantage of this approach is that it requires a relatively complex circuit in the integrated circuit to carry out the switching operation between the analog variable of the voltage drop as the temperature indication and the provision of the rotational speed sensor signal. Furthermore, the control unit which evaluates the information provided by the integrated circuit must be suitable for evaluating the analog temperature indication.

If is therefore an object of the present invention to provide a method and a device for easily providing a rotational speed indication and a temperature indication for a supercharging system, the complexity for providing the rotational speed indication and the temperature indication in a control unit, which is separate from the supercharging unit, being reduced.

BRIEF SUMMARY OF THE INVENTION

According to a first aspect of the present invention, a detection circuit is provided for providing a rotational speed indication of a rotational speed of a supercharging system for an internal combustion engine and a temperature indication of the supercharging system. The detection circuit includes:
 a rotational speed sensor for providing a periodic detection signal whose frequency depends on a rotational speed in the supercharging system;
 a temperature sensor for detecting a temperature indication of a temperature in the supercharging system; and
 a modification unit for providing a periodic output signal whose periodicity depends on the periodic detection signal, and for setting a time length of a signal pulse of the periodic output signal as a function of the detected temperature indication, so that the periodic output signal provides the rotational speed indication by its periodicity and the temperature indication by the time length ($t_T$) of the signal pulse.

The above detection circuit makes it possible to easily provide a rotational speed indication or a temperature indication about the rotational speed or the temperature in a supercharging system for an internal combustion engine, so that the rotational speed and the temperature may be evaluated in a particularly easy manner by a separate control unit, which is provided with the rotational speed indication and the temperature indication. In particular, the rotational speed is coded in the form of a frequency of provided signal pulses, the frequency indicating the rotational speed of an element of the supercharging system, such as the compressor wheel. It is also possible to code a temperature in the supercharging system via the time length of the signal pulse. This makes it possible to infer the rotational speed of the rotor assembly of the supercharging system in a control unit to which the detection signal is provided, by easily evaluating the frequency of the pulses, and to detect a temperature indication by measuring the pulse length of the detection signal. This eliminates the need to inject a current for measuring the temperature in the supercharging system or for measuring an analog voltage via the control unit, as is the case according to the related art.

The above detection circuit makes it possible to provide the detection of the rotational speed indication and the temperature indication from a supercharging system in a single detection signal and, furthermore, to evaluate the provided detection signal in an exclusively digital manner.

Moreover, a temperature evaluation unit may be provided for providing a temperature value as a function of the detected temperature indication, the modification unit being designed to set a time length of the signal pulses of the output signal as a function of the temperature value.

This makes it possible to provide the temperature indication, which is frequently provided as an electrical variable, to the modification unit in a suitable form, in particular in digital form, so that the time length of the signal pulses may be easily adapted.

According to an example embodiment, the temperature sensor may provide an electrical variable as the temperature indication, the temperature evaluation unit digitizing the temperature indication, in particular by one or more threshold value comparisons, and providing an item of digital information as the temperature value.

A frequency divider may be provided for dividing a frequency of the detection signal according to a predefined divider value to obtain a detection signal having a divided frequency and to provide it to the modification unit, the modification unit being designed to provide the periodic output signal as a signal having the divided frequency and having signal pulses whose time length depends on the detected temperature indication.

According to a further aspect of the present invention, a control unit is provided for controlling the operation of an internal combustion engine, the control unit being designed to receive a periodic signal, to determine a frequency of the received signal, to ascertain a rotational speed indication from the frequency, to ascertain a temperature indication from the time length of a signal pulse of the received signal, and to operate the internal combustion engine as a function of the ascertained rotational speed indication and the ascertained temperature indication.

According to another aspect of the present invention, an engine system is provided with the above detection circuit, which is situated on a supercharging system of an internal combustion engine, and with a control unit for controlling the operation of the internal combustion engine, the control unit being connected to the detection circuit to obtain the periodic output signal and to ascertain a rotational speed indication from the frequency of the periodic output signal and a temperature indication from the time length of a signal pulse of the periodic output signal.

According to a further aspect of the present invention, a method is provided for providing a rotational speed indication about a rotational speed of a supercharging system for an internal combustion engine and a temperature indication of the supercharging system. The method includes the following steps:

providing a periodic detection signal whose frequency is a function of a rotational speed in the supercharging system;

detecting a temperature indication about a temperature in the supercharging system;

providing a periodic output signal whose periodicity depends on the periodic detection signal; and setting a time length of a signal pulse of the periodic output signal as a function of the detected temperature indication, the periodic output signal providing the rotational speed indication by its periodicity and the temperature indication by the time length ($t_T$) of the signal pulse.

Moreover, a temperature value may be provided as a function of the detected temperature indication, the time length of the signal pulse of the output signal being set as a function of the temperature value.

According to an example embodiment, the temperature indication may be provided in the form of an electrical variable, the temperature indication being digitized, in particular by one or more threshold value comparisons, and an item of digital information being provided as the temperature value.

The detection signal may be divided according to a predefined divider value to obtain the detection signal having a divided frequency, a signal having the divided frequency and signal pulses whose time length depends in each case on the detected temperature indication being provided as the output signal.

Moreover, the output signal may be received by a control unit, which is designed to be separate from the supercharging system, for controlling the operation of the internal combustion engine, the control unit ascertaining the rotational speed indication from the frequency of the output signal and a temperature indication from the time length of the signal pulse of the output signal.

DETAILED DESCRIPTION OF THE INVENTION

Figure 1:
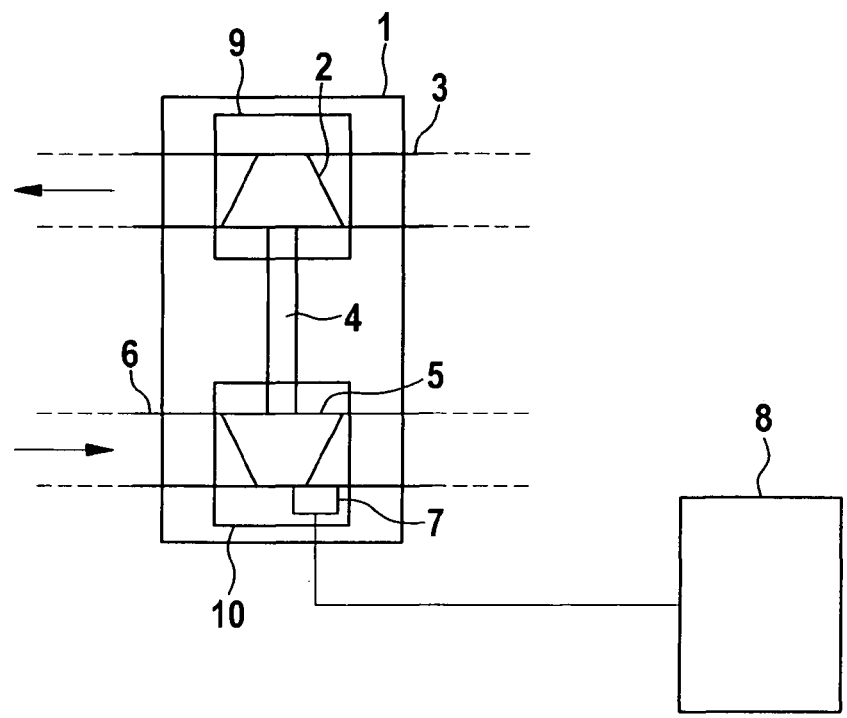
FIG. 1 shows a schematic representation of a supercharging system having a detection circuit which is connected to a control unit.

FIG. 1 shows a schematic representation of a supercharging system 1 which is designed as an exhaust gas turbocharger in this exemplary embodiment. Supercharging system 1 includes a turbine 9 having a turbine wheel 2, which is situated in an exhaust gas section 3 of an internal combustion engine (not shown) and is driven by an exhaust gas flow of combustion exhaust gases. Turbine wheel 2 is coupled to a compressor wheel 5 of a compressor 10 via a shaft 4 in such a way that compressor wheel 5 is driven by the rotation of turbine wheel 2. Other couplings of turbine wheel 2 of turbine 9 to compressor wheel 5 of compressor 10 are also possible.

Compressor wheel 5 is situated in an air supply section 6 in such a way that air is transported from the environment in the direction of the output side of compressor 10, where it is provided under a boost pressure. The compressed air permits higher driving torques and generally the ability to operate the internal combustion engine at higher efficiency.

To improve the control or regulation of the operation of supercharging system 1, a rotational speed of the rotor assembly, i.e., turbine wheel 2, shaft 4, and compressor wheel 5, must be known. With the aid of a rotational speed indication, it is possible to avoid critical operating points and excess rotational speeds by intervening in the engine operation if need be, i.e., as a function of the ascertained rotational speed or as a function of a result of a threshold value comparison of the rotational speed.

For the purpose of detecting the rotational speed, a detection circuit 7 is provided, which is situated on or near compressor wheel 5 to suitably ascertain the rotational speed of compressor wheel 5. Different methods for detecting the rotational speed of compressor wheel 5 may be used. For example, the rotational speed may be ascertained with the aid of a Hall sensor. In this case, a magnet is situated on turbine wheel 2, on compressor wheel 5, or on shaft 4, and a Hall sensor element is provided to detect the passage of the magnet. When compressor wheel 5 rotates, the detection signal corresponds to a periodic signal whose frequency is in proportion to the rotational speed. Alternatively, a rotational speed may be detected by the blades of compressor wheel 5 passing a giant magnetoresistance (GMR) element. According to this measuring principle, an influence of a magnetic field is measured by the passage of the blades of compressor wheel 5. Other options for detecting the rotational speed are known from the related art and are not discussed in further detail here. Depending on the way in which detection circuit 7 is situated on compressor wheel 5, one or more pulses is/are generated each time compressor wheel 5 rotates.

What the devices for detecting the rotational speed have in common is the fact that the rotational speed is coded in a detection signal which includes consecutive signal pulses, the frequency of the signal pulses indicating the rotational speed of compressor wheel 5 or being in proportion thereto. An output signal dependent on the detection signal is communicated to a control unit 8, which intervenes in the engine system according to the rotational speed indication, for example to control the rotational speed of supercharging system 1 or to avoid an excess rotational speed.

Moreover, a temperature is detected in detection circuit 7 in such a way that a temperature indication may be provided to control unit 8, which is connected to detection circuit 7.

Figure 2:
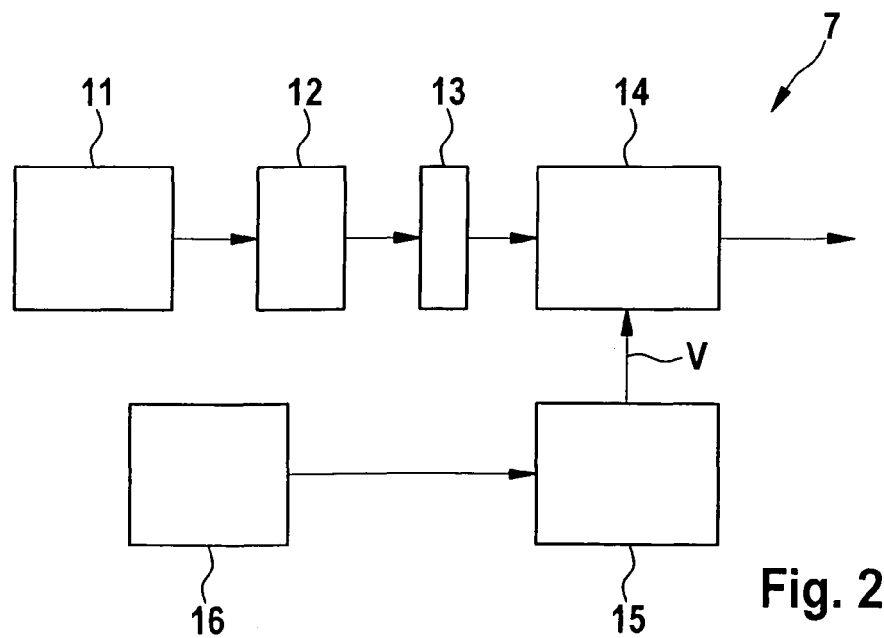
FIG. 2 shows a schematic representation of the detection circuit, which is situated in the supercharging system and provides the detection signal.

Detection circuit 7 is preferably designed as an integrated circuit, e.g., as an application-specific integrated circuit (ASIC), which is situated near the rotor assembly of supercharging system 1. Detection circuit 7 is illustrated in greater detail in FIG. 2. Detection circuit 7 includes rotational speed sensor 11, which provides a sequence of signal pulses (high level) as the detection signal, whose frequency indicates the rotational speed of compressor wheel 5. The detection signal is amplified in an analog manner by a signal amplifier 12 and may subsequently be supplied to an optional frequency divider 13. Frequency divider 13 reduces the frequency of the detection signal in such a way that low-interference transmission and evaluation are possible.

The frequency division of frequency divider 13 may be designed, for example, with the aid of a simple counter which increments the detection signal at each signal pulse and, upon reaching a divider value, outputs a signal pulse in the form of a first signal level, e.g., a high level, for a time period which corresponds to a time length $t_T$ of the signal pulse and resets the counter value, e.g., to 0. At the end of this time period, a second signal level, e.g., a low level, is output until the next time the divider value has been reached. For example, the first signal level may be defined for a time period from the reaching of the divider value in the counter until a next edge of the detection signal, or as a predefined absolute time period or as a relative time period in relation to the period of the signal output by frequency divider 13. The signal output by frequency divider 13 has a period $t_P$. The divider value indicates a divider factor or a division ratio at which the frequency of the detection signal is reduced or period $t_P$ of the detection signal is increased. The divider value for the detection signal may be defined by a suitable default setting t. The divider value may be selected in such a way that the detection signal has a frequency at which low-interference transmission and evaluation are possible. If the divider value of frequency divider 13 and the number of signal pulses generated by detection circuit 7 for each rotation of compressor wheel 5 are known, the rotational speed of compressor wheel 5 may be ascertained in control unit 8.

Time length $t_T$ of the signal pulse output by frequency divider 13 for each period may be set to an absolute time period or determined by a pulse duty factor such as 50%, which indicates a ratio between the time periods of a high level and a low level. Time length $t_T$ may be modified or set in modification unit 14. Modification unit 14 receives the periodic signal provided by frequency divider 13 and modifies time length $t_T$ of the signal pulses as a function of a temperature value V, which is provided by a temperature evaluation unit 15, to obtain the output signal. Modification unit 14 modifies the periodic signal in such a way that the frequency or periodicity of the periodic signal is retained.

Temperature evaluation unit 15 is connected to a temperature sensor 16, which may be designed, for example, with the aid of a diode (not illustrated), whose current-voltage characteristic is a function of the temperature. The diode may be designed to be integrated into detection circuit 7 or situated as a separate component in a suitable position in supercharging system 1 at which the temperature is to be detected. Instead of the diode, any other temperature-sensitive component may be provided, such as a temperature-sensitive resistor or the like.

Temperature sensor 16 generally supplies an analog electrical variable as an indication of the temperature, such as a current upon specifying a measurement voltage or a voltage upon specifying a measurement current. The corresponding electrical variable may be evaluated in temperature evaluation unit 15, for example, to obtain a digitized temperature value. For example, an indication of the temperature may be digitized, for example with the aid of one or more threshold value comparisons of the electrical variable, using one or more temperature threshold values. Of course, other analog/digital conversion methods may also be used to provide the electrical variable which indicates the temperature, digitized as temperature value V.

As a function of the result of the comparison or as a function of the digitized temperature indication, temperature value V may be ascertained according to a predefined mapping function. Temperature value V (function value of the mapping function as a function of the temperature indication) may indicate, for example, an absolute value or a relative value using which time length $t_T$ of the signal pulses of the output signal communicated to control unit 8 is modified.

Modification unit 14 may include, for example, a further counter which is started at each edge of a set edge direction (e.g., rising edge) and counts up to a counter value (timed by a predefined constant system clock) which is a function of digitized temperature value V or corresponds thereto. Simultaneously upon startup of the further counter and during counting, a first signal level of the output signal is output, and a second signal level is output upon or after reaching the counter value. As indicated above, it must be provided that the permissible value range of temperature value V is set in such a way that the counter values are greater than 0 and less than the ratio between period $t_P$ of the signal output by frequency divider 13 and the period of the system clock. This may be accomplished, for example, by limiting temperature value V to a corresponding maximum value after it is generated. Alternatively, the temperature indication may already be mapped to a corresponding temperature value V according to a mapping function which has a minimum temperature value of greater than 0 and a maximum permissible temperature value which is less than the ratio between period $t_P$ of the signal output by frequency divider 13 and the period of the system clock.

To limit temperature value V, the mapping function may be selected in such a way that the signal pulse at maximum temperature value V is generated in the modification unit having a time period which is smaller than the period of the periodic output signal and the signal pulse at minimum temperature value V is generated in the modification unit having a time period which is greater than 0, so that a periodic signal having signal pulses is retained. The mapping function may map the temperature indication linearly, logarithmically, or according to another function. In particular, the mapping function may equalize the non-linearity of the diode characteristic which occurs when using a diode to measure temperature, so that the connection between the measured temperature and temperature value V becomes linear.

Alternatively, modification unit 14 may include a monoflop of an analog design which generates a signal pulse of a variable, settable time length $t_T$ as a function of a pulse edge. A monoflop is suitable, in particular, if an analog electrical variable is transmitted to modification unit 14 as the temperature value. A time period, during which a first signal level is output after an edge of a particular edge direction, may then be set as a function of the electrical variable. Analog temperature value V may be limited in temperature evaluation unit 15 and implemented, for example, by a limited linear or non-linear amplifier whose output variable is limited to a minimum value and a maximum value. For example, an operational amplifier may be used for this purpose.

Figure 3:
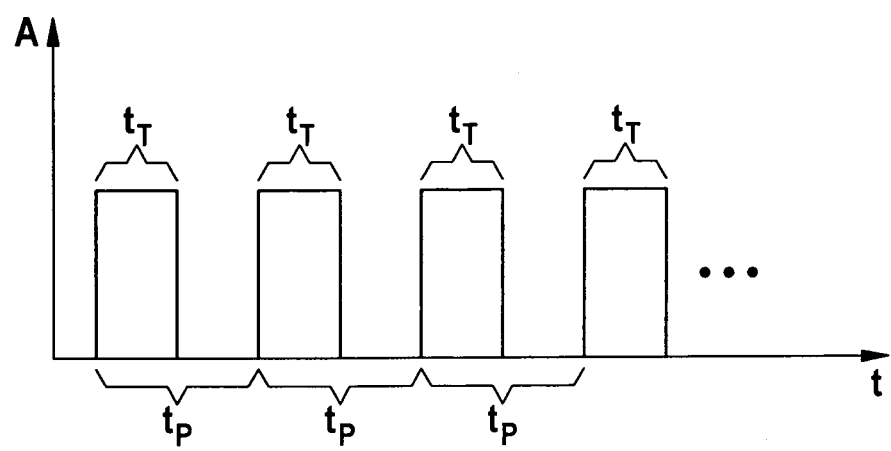
FIG. 3 shows a representation of a signal curve of output signal A over time t.

A signal curve of output signal A over time t, which is illustrated by way of example in FIG. 3, is obtained as the result. Period $t_P$ of the output signal corresponds to the period of the signal provided by frequency divider 13. Time length $t_T$ of the signal pulse indicates a temperature indication to be transmitted.

Of course, the pulse duration of the signal pulse should be set only in such a way that the periodicity of the output signal is not negatively affected, i.e., the pulse duration should not be 0 and must be less than the total period of the signal provided by frequency divider 13. The predetermined value range to be transmitted for the detected temperature is therefore mapped to pulse durations between 0 and the period of the signal provided by frequency divider 13. Alternatively, it may be provided that temperature value V is not limited in temperature evaluation unit 15, but in modification unit 14.

The periodic output signal of detection circuit 7 is evaluated in control unit 8 by measuring its frequency to obtain a rotational speed indication. The rotational speed may be ascertained from the rotational speed indication by dividing the frequency of the periodic output signal ascertained by control unit 8 by the number of signal pulses generated by detection circuit 7 for each rotation of compressor wheel 5 and multiplying it by the divider factor used in frequency divider 13. To do this, the corresponding indications must be provided in the control unit, for example in a memory which is not illustrated.

Moreover, the time length of one of the signal pulses of the output signal may be measured with the aid of a simple time measurement, which is usually implemented in microcontrollers, so that the temperature indication dependent on the length of the signal pulses is provided therein. This may be accomplished, for example, by starting a time count at a first edge of the received periodic output signal and by stopping the time count at a second edge of the received periodic output signal. The measured time is converted into a temperature indication which corresponds to or indicates the measured temperature according to a further mapping function which is predefined in control unit 8 (which may be inverted in relation to the mapping function implemented in the temperature evaluation unit).

By coding the rotational speed indication and the temperature indication in the above manner into the periodic output signal, control unit 8 may be provided without an additional analog evaluation system or an additional analog/digital converter for evaluating the temperature indication. The rotational speed indication and the temperature indication are used in the control unit to regulate the operation of the engine system. With the aid of the rotational speed indication about the rotational speed of the rotary assembly in supercharging system 1 and the temperature indication about a temperature in supercharging system 1, the operating mode or the operating point of the internal combustion engine may be set, for example to optimize the efficiency of supercharging system 1, to avoid an excessive rotational speed or the like.

What is claimed is:

1. A detection circuit configured to detect a rotational speed and a temperature of a supercharging system for an internal combustion engine, comprising:
    a rotational speed sensor configured to provide a periodic detection signal having a frequency dependent on the rotational speed of the supercharging system;
    a temperature sensor configured to detect the temperature of the supercharging system; and
    a modification unit configured to provide a periodic output signal having a periodicity dependent on the periodic detection signal, and configured to set a time length of a signal pulse of the periodic output signal as a function of the detected temperature of the supercharging system, wherein the periodicity of the periodic output signal provides an indication of the rotational speed of the supercharging system, and wherein the time length of the signal pulse provides an indication of the temperature of the supercharging system.

2. The detection circuit as recited in claim 1, further comprising:
    a temperature evaluation unit configured to provide a temperature value as a function of the indication of the temperature, wherein the modification unit is configured to set the time length of the signal pulse of the output signal as a function of the temperature value.

3. The detection circuit as recited in claim 2, wherein the temperature sensor is configured to provide an electrical variable as an indication of the detected temperature, and wherein the temperature evaluation unit is configured to digitize the indication of the temperature by using at least one threshold value comparison and provide digitized information as the temperature value.

4. The detection circuit as recited in claim 1, further comprising:
    a frequency divider configured to divide a frequency of the periodic detection signal according to a predefined divider value to generate a detection signal having a divided frequency which is provided to the modification unit, wherein the modification unit provides a periodic output signal having the divided frequency.

5. A control unit for controlling the operation of an internal combustion engine having a supercharging system, comprising:
   a means for receiving a periodic signal;
   a means for determining a frequency of the received periodic signal;
   means for ascertaining a rotational speed of the supercharging system based on the determined frequency of the received periodic signal; and
   means for ascertaining a temperature of the supercharging system based on the time length of a signal pulse of the received periodic signal; and
   means for controlling the operation of the internal combustion engine as a function of at least one of the ascertained rotational speed and the ascertained temperature.

6. The control unit as recited in claim 5, wherein the ascertaining of the rotational speed includes:
   ascertaining the number of pulses detected per rotation; and
   multiplying the determined frequency of the received periodic signal by a predetermined divider factor and subsequently dividing by the number of pulses detected per rotation.

7. An internal combustion engine system, comprising:
   a supercharging system:
   a detection circuit situated on the supercharging system, the detection circuit including:
   a rotational speed sensor configured to provide a periodic detection signal having a frequency dependent on the rotational speed of the supercharging system;
   a temperature sensor configured to detect the temperature of the supercharging system; and
   a modification unit configured to provide a periodic output signal having a periodicity dependent on the periodic detection signal, and configured to set a time length of a signal pulse of the periodic output signal as a function of the detected temperature of the supercharging system, wherein the periodicity of the periodic output signal provides an indication of the rotational speed of the supercharging system, and wherein the time length of the signal pulse provides an indication of the temperature of the supercharging system; and
   a control unit for controlling the operation of the internal combustion engine, wherein the control unit is connected to the detection circuit to receive the periodic output signal and configured to ascertain a rotational speed indication based on the frequency of the periodic output signal and ascertain a temperature indication based on the time length of the signal pulse of the periodic output signal.

8. A method for providing indications of rotational speed and temperature of a supercharging system for an internal combustion engine, comprising:
   providing a periodic detection signal having a frequency dependent on the rotational speed of the supercharging system;
   detecting a temperature in the supercharging system;
   providing a periodic output signal having periodicity dependent on the periodic detection signal; and
   setting a time length of a signal pulse of the periodic output signal as a function of the detected temperature;
   wherein the periodicity of the periodic output signal provides the rotational speed indication, and wherein the time length of the signal pulse provides the temperature indication.

9. The method as recited in claim 8, wherein the temperature indication is provided in the form of an electrical variable representing digital information, the temperature indication being digitized by at least one threshold value comparison.

10. The method as recited in claim 8, wherein the periodic detection signal is divided according to a predefined divider value to obtain a resulting detection signal having a divided frequency, and wherein the periodic output signal has the divided frequency and signal pulses with respective time lengths dependent on the detected temperature indication.

11. The method as recited in claim 8, wherein the periodic output signal is transmitted to a control unit which is separate from the supercharging system and configured to control the operation of the internal combustion engine, and wherein the control unit ascertains the rotational speed indication from the frequency of the output signal and ascertains the temperature indication from the time length of the signal pulse of the output signal.

* * * * *